March 17, 1959  H. N. BARR  2,878,140
DENSIFICATION OF COATING BY USE OF ISOSTATIC HYDRAULIC PRESSURE
Filed May 1, 1957
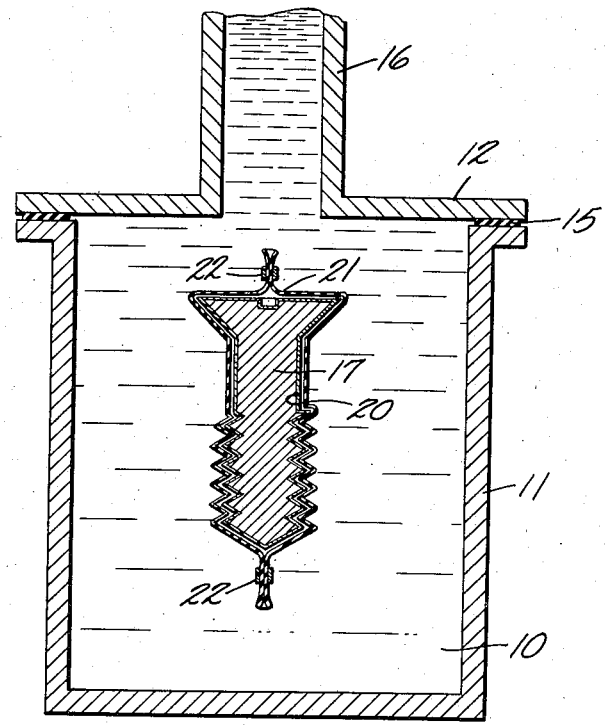
INVENTOR.
HAROLD N. BARR
BY
ATTORNEYS

United States Patent Office 2,878,140
Patented Mar. 17, 1959

2,878,140

DENSIFICATION OF COATING BY USE OF ISOSTATIC HYDRAULIC PRESSURE

Harold N. Barr, Baltimore, Md., assignor to Vitro Corporation of America, Verona, N. J.

Application May 1, 1957, Serial No. 656,315

6 Claims. (Cl. 117—65)

This invention relates to the preparation of coatings on the surface of a substrate.

One of the disadvantages of known procedures for forming protective coatings on metal subtrates is the porosity of the coating that is produced. Accordingly, the coating art has long sought for a process for preparing coatings which are free of pores.

A publication entitled "Electrophoretic Deposition of Metallic and Composite Coatings," by Shyne et al. in "Plating," October 1955, pages 1255–1258, describes a process in which a coating deposited by electrophoresis is subjected to a densification treatment by mechanical working such as rolling, ball burnishing or spinning. However, these known techniques can only be applied readily to certain uniform shapes such as flat sheets and cylindrical rods, and moreover there is danger of damaging the metal substrate.

An object of the invention is to provide an improved process for preparing dense coatings on regularly and irregularly-shaped objects with no severe mechanical working which may damage or distort the substrate on which the coating is being formed.

The foregoing and other objects of the invention are realized by producing a primary coating of discrete discontinuous particles comprising particles of at least one material which can be sintered below the melting point of the substrate on the surface of the substrate by any of a variety of procedures described below. The coating is thereafter isostatically pressed against the substrate uniformly by fluid pressure to densify the coating and thereafter the densified coating is heated at a temperature high enough to sinter the sinterable particles therein.

The body containing the primary coating of discrete disconnected particles comprising sinterable material is placed in a soft rubber sleeve or soft plastic sleeve which is then evacuated and tied off at both ends. The sleeve is then placed in a liquid in a hydrostatic pressure chamber and pressure of about 15 tons per square inch to about 50 tons per square inch is applied to the liquid for a time sufficient to achieve maximum densification of the coating of discrete particles on the substrate. The time during which the coating and substrate are subjected to the hydraulic pressure is not critical and may vary from a few minutes up to half an hour. The pressure is released and the coated substrate is removed from the rubber or plastic sleeve.

Thereafter the densified substrate is sintered at the desider sintering temperature. The sintering temperature will depend upon the composition of the particular coating, the nature of the substrate and the temperature required to cause the particles of coating material to adhere to each other and to the substrate. The temperature and the time of treatment and the nature of the coating material and substrate are to a degree interdependent, shorter times being required at higher temperatures with metals with which the bond between the coating and substrate forms more rapidly, and conversely longer times being required at lower temperatures for coating materials and substrates for which the bond forms more slowly.

The sintering is preferably carried out in an inert atmosphere such as hydrogen. Coatings containing nickel and iron have been sintered by heating at 1000–1100° C. in an atmosphere of hydrogen, whereas molybdenum coatings may be sintered at temperatures of 1100–1300° C. in a hydrogen atmosphere containing a halogen such as hydrogen chloride, as disclosed and claimed in the patent application of Barr and Scheible entitled "Formation of Coatings," Serial No. 656,214, filed May 1, 1957.

The coatings formed by the process of this invention may have densities which are about 95–99% of the theoretical or intrinsic density of the coating material, which indicates a very low porosity.

Coatings may be formed on a variety of substrates such as metals, graphite and ceramic. Moreover, a variety of coating materials may be used, including ceramics, metals and metal oxides. However, the choice of coating material for the particular substrate should be such that the sinterable ingredient of the coating may be sintered at a temperature which is substantially below the melting point of the substrate.

As a first step in preparing the metal substrate for treatment, the coating material whether it be metal, metal oxide or ceramic or mixtures of any two or more of these types of materials, may be applied to the surface of the metal substrate by a variety of procedures such as electrophoretic deposition, spraying, dipping or painting. However, it is preferred to use electrophoretic deposition, which is described in the Shyne et al. publication referred above. In the electrophoretic coating process, a suspension of the material to be deposited in a suitable liquid vehicle (preferably an organic solvent) is prepared. The suspension may be prepared by ball milling the coating material in the solvent, for example alcohol, to obtain a finely dispersed material. Particles ranging in diameter from 0.5 to 10 microns are preferred, although dispersions containing particles from 0.1 to 74 microns have been prepared and deposited. The electrical charge on the particle is acquired during the dispersing operation because of absorption of ionizable substances or a reaction between the solid and liquid. The organic liquids that are preferred for use as suspending vehicles prevent electrolytic reaction and the gassing of the electrodes. The article to be coated is made one of the electrodes in a bath of the suspension. The suspension is preferably agitated slowly during deposition to prevent settling. Cell voltages of 200 to 1000 volts D. C. are permissible because the vehicle is an anhydrous solvent. The surface of the metal substrate is preferably thoroughly cleaned before it is immersed in the plating bath. Coating thicknesses can be varied with the deposition time, electrode spacing, voltage and suspension concentration.

The other methods of coating which may be used, such as spraying, dipping, painting, etc. can be carried out by known processes.

If a reducible metal oxide or another reducible compound is present in the coating which is applied to the substrate (in which case the coating is designated a "green" coating), the deposited material is treated to convert the oxide or other compound to the metal to produce the primary or sinterable coating. This may be done by heating it in a reducing atmosphere at a minimum temperature required to reduce the compound to the metallic state without sintering the metal particles in the coating, i. e. about 400–800° C. for molybdenum oxide, 300° C. for nickel oxide and 400° C. for ferric oxide, in an atmosphere of gaseous hydrogen in each case.

The procedure for carrying out the densification of the coating as described herein may be understood by reference to the single figure appearing in the appended drawing.

A hydrostatic pressure chamber 10 is formed within a chamber housing 11 supported by means not shown and is fitted with a top or closure member 12 sealed thereto by a clamping mechanism not shown and by a high pressure gasket 15, which is shown schematically. The closure member 12 is provided with a high pressure tube 16 which leads to a mechanism not shown for applying pressure to the system.

The substrate shown in the drawing is a metallic screw 17 having a coating 20 thereon of discrete disconnected particles comprising sinterable material, enclosed within a tube 21 of rubber or plastic material. Before the screw is placed in the chamber 10, it is inserted in the tube 21, the tube is evacuated and then sealed off by the metal clips 22. It is supported in the chamber 10 by means not shown. After the chamber 10 is filled with liquid, such as glycerine, the top or cover 12 is secured in place. The tube 16 is filled with liquid and pressure is applied to the system as heretofore described. It will be observed that the plastic envelope 21 conforms to the irregular surface of the screw thread so that the hydraulic pressure is applied evenly and equally to all portions of the coating, thereby to provide effective and uniform densification of the coating 20.

The following examples are presented as illustrations of the invention, and not in a limiting sense.

*Example I*

A dispersion was prepared containing 30 g. nickelous oxide (—325 mesh), 0.6 g. zein, 162 g. isopropanol, and 108 g. nitromethane. The nickelous oxide was electrophoretically deposited on a steel screw thread. At 300 volts D. C., and 10 milliamperes current, a green coating equivalent to approximately 3 mils of nickel metal was deposited in 45 seconds. The coating was reduced at 400° C. in an atmosphere of purified hydrogen. The coated specimen was then put into a rubber sleeve which was evacuated and sealed at both ends. The enveloped specimen was then placed in a glycerol-filled die cavity where it was subjected to an isostatic pressure of 25 tons per square inch. After removing the envelope, the coated specimen was placed in a furnace and the coating was sintered at 1000° C. in purified hydrogen for 1 hour. Photomicrographs showed that the coating had high density, good uniformity, and excellent bonding to the metal substrate.

*Example II*

A dispersion was prepared containing 104 g. nickelous oxide (—325 mesh), 20 g. chromium powder (0–10 microns), and 1.0 g. ethyl cellulose in 500 ml. of 2-nitropropane. The dispersion was ball-milled for 1 hour and then used to coat molybdenum specimens electrophoretically. At 500 volts D. C. and 12 milliamperes current, a coating equivalent to approximately 2 mils of Nichrome was deposited in 15 seconds. The green coating was reduced at 400° C. for ½ hour in purified hydrogen and pressed isostatically at 50 tons per square inch. After removing the envelope, the coated specimen was heated at about 1100° C. in an atmosphere of hydrogen for about 20 minutes to sinter the coating. Photomicrographs of the coating showed high density and good bonding to the metal base. Tests showed excellent resistance to impact and thermal shock.

*Example III*

A dispersion was prepared containing 925 g. iron oxide (—325 mesh $Fe_3O_4$), 17.8 g. nickelous oxide (—325 mesh), 17.8 g. chromium powder (0 to 10 microns), and 1.0 g. ethyl cellulose in 800 milliliters of 2-nitropropane. The dispersion was ball-milled for 4 hours, and then used to coat mild steel specimens electrophoretically. At 500 volts D. C. and 5 milliamperes current, a coating equivalent to approximately 4 mils of stainless steel was deposited in 20 seconds. The green coating was reduced at 500° C. for 1 hour in purified hydrogen and pressed isostatically at 25 tons per square inch. After removing the envelope, the coated specimen was heated at about 1100° C. in an atmosphere of hydrogen for about 20 minutes to sinter the coating. Photomicrographs of the coating showed high density and good bonding to the metal base.

*Example IV*

A dispersion was prepared containing 20 g. molybdenum trioxide (—325 mesh), 80 g. molybdenum powder (—325 mesh), and 0.5 g. tannic acid in 500 milliliters of 1-nitropropane. The dispersion was ball-milled for 1 hour in a steel mill and then used to electrophoretically coat Inconel specimens which had been given an undercoat of nickel. At 400 volts D. C., a coating equivalent to approximately 2 mils of densified molybdenum was deposited in 10 seconds. The green coating was reduced at 800° C. in purified hydrogen, and pressed isostatically at 50 tons per square inch. After removing the plastic envelope the coated specimen was heated at about 1200° C. in an atmosphere of hydrogen containing about 2 mol percent HCl to sinter the coating. Photomicrographs of the coating showed high density and good bonding to the metal base.

*Example V*

A dispersion was prepared containing 30 g. molybdenum powder (—325 mesh), 0.6 g. zein, 240 milliliters of nitromethane and 40 milliliters of isopropanol. This dispersion was used to electrophoretically coat specimens of #316 stainless steel. At 1000 volts D. C. and 15 milliamperes current, a coating equivalent to approximately 4 mils of densified molybdenum was deposited in 90 seconds. The coating was pressed isostatically at 25 tons per square inch and sintered for 3 hours in an atmosphere of hydrogen containing 2 mol-percent hydrogen chloride at 1200° C. Photomicrographs of the coating showed a high density and a good diffusion bond to the metal base. Tests proved that the coating had excellent resistance to thermal shock.

*Example VI*

A dispersion was prepared containing 13.4 g. chromium carbide (—325 mesh $Cr_3C_2$), 226 g. nickelous oxide (—325 mesh), 0.5 g. ethyl cellulose, and 400 milliliters of 2-nitropropane. After ball-milling for 3 hours in a steel mill, the dispersion was used to electrophoretically coat molybdenum specimens which had been given a 2-mil thick undercoat of Nichrome. At a plating voltage of 750 volts D. C. and 9 milliamperes current, a coating equivalent to 2 mils of nickel-chromium carbide was deposited in 1 minute. The green coating was reduced at 400° C. and pressed isostatically at 50 tons per square inch. A final sinter was given at 1000° C. for 1 hour in a purified hydrogen atmosphere. Photomicrographs of the coating showed high density, good bonding, and excellent dispersion of the chromium carbide in the nickel matrix. Tests proved the coating possessed excellent resistance to impact, abrasion, and thermal shock.

The coating produced by the method described herein is dense, well sintered, has low porosity and is firmly bonded to the substrate and in other respects fulfills the objects and provides the advantages of the invention. Moreover, in the case of metal substrate and coatings comprising sinterable metal, the coatings formed are far superior to any which have been produced by previously known methods even those produced by flame spraying and vapor deposition, as shown by the well defined diffusion layer at the interface of the coating material and metal substrate in the structure produced according to the invention, the higher density of the coating, and the resistance of the final structure to thermal shock.

Although specific illustrations of the invention have been given it will be apparent that there are many modi-

I claim:

1. In the preparation of a coating on the surface of a substrate the steps of forming a primary coating of discrete disconnected sinterable particles on said surface, covering said coating with a preformed flexible sheet, applying isostatic hydraulic pressure to said sheet and to the coating which the sheet covers thereby to densify said coating, and thereafter heating said coating at a temperature high enough to cause said sinterable particles to sinter but below the melting point of the substrate for a time sufficient to sinter said particles, the proportion of sinterable particles in said primary coating being sufficient to form a dense adherent coating of low porosity on said substrate.

2. The method of claim 1 wherein said preformed flexible sheet is a liquid-impermeable envelope which encloses the substrate carrying the primary coating while the pressure is applied thereto.

3. The method of claim 2 wherein the envelope is evacuated before the pressure is applied.

4. The method of claim 1 wherein the pressure is about 15 to about 50 tons per square inch.

5. The method of claim 1 wherein the substrate is a metal.

6. The method of claim 1 wherein a green coating comprising a reducible oxide of a metal is applied to the substrate which is then reduced at a temperature below the sintering temperature of the coating to form said primary coating before the pressure is applied thereto.

References Cited in the file of this patent

UNITED STATES PATENTS

| | | |
|---|---|---|
| 1,819,336 | Penning | Aug. 18, 1931 |
| 1,914,774 | Govers | June 20, 1933 |
| 2,068,082 | Sherts | Jan. 19, 1937 |
| 2,403,706 | Bryant | July 9, 1946 |
| 2,671,955 | Grubel et al. | Mar. 16, 1954 |